E. L. ACKER.
VEHICLE WHEEL.
APPLICATION FILED JAN. 2, 1918.
1,296,151. Patented Mar. 4, 1919.
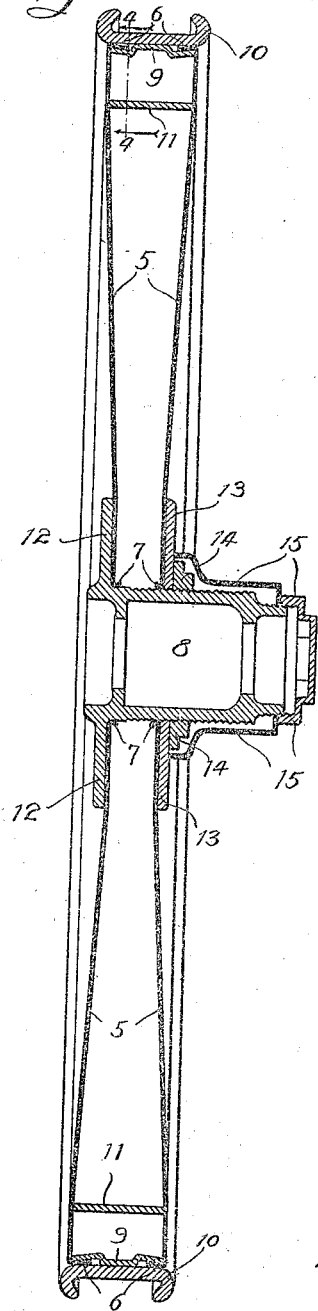
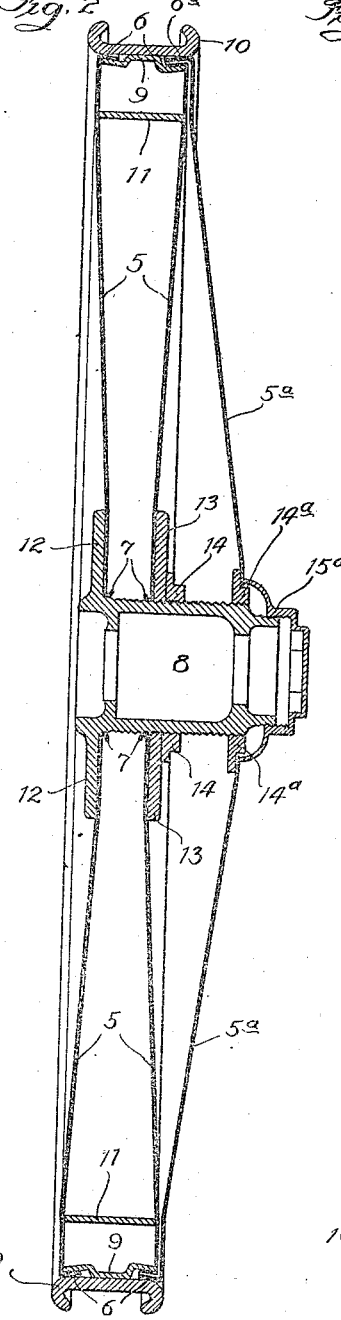
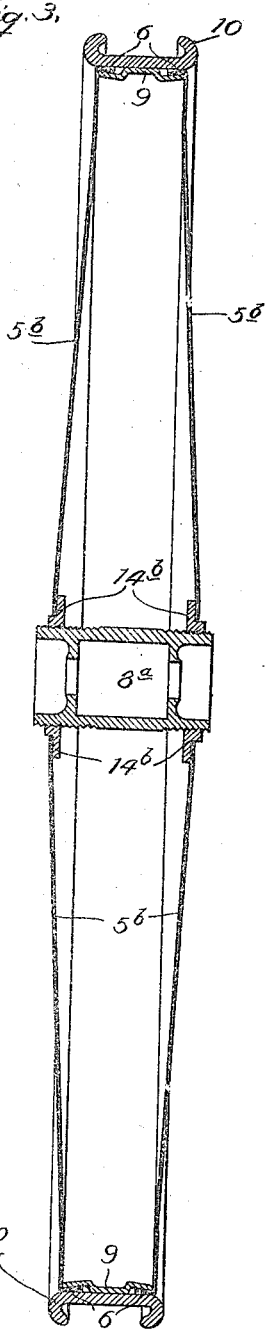
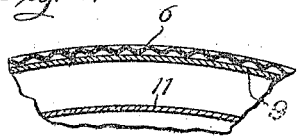
Witnesses:
Marvin P. Kahl
Irwin C. Bowman
Inventor:
Elmer L. Acker,
By Dyrenforth, Lee, Chritton and Wiles
Attys

UNITED STATES PATENT OFFICE.

ELMER L. ACKER, OF CHICAGO, ILLINOIS.

VEHICLE-WHEEL.

1,296,151.  Specification of Letters Patent.  Patented Mar. 4, 1919.

Application filed January 2, 1918. Serial No. 210,029.

*To all whom it may concern:*

Be it known that I, ELMER L. ACKER, a citizen of the United States, residing at Chicago, in the county of Cook and State of Illinois, have invented a new and useful Improvement in Vehicle-Wheels, of which the following is a specification.

My invention relates to improvements in vehicle-wheels and particularly of the class of such wheels on which pneumatic-tire rims are used, though the invention is not intended to be limited thereto.

My primary object is to provide a vehicle-wheel of light weight and strong construction; and to that end I employ the principle of forming the wheel-center of a pair of disks of resilient material, confined between the wheel-rim and hub and strained, for stiffening them to reinforce the structure, into converged condition by axial deflection of their central portions, in which position the disks are secured.

In the accompanying drawings, Figure 1 is a central vertical section of a vehicle-wheel embodying my invention in its preferred form; Fig. 2 is a similar view of the same showing an added outer reinforcing disk under stiffening strain; Fig. 3 is a view like that presented in Fig. 1, but illustrating a modification, and Fig. 4 is an enlarged broken section on line 4—4, Fig. 1, but omitting the outer wheel-rim.

Referring particularly to Fig. 1, the wheel-center is formed of a pair of annular disks, 5, 5, of adequately resilient, strong and relatively light material, preferably sheet-steel. Each disk is flanged inwardly about its peripheral section, as represented at 6, these flanges being shown to be longitudinally corrugated in Fig. 4; and each disk is bent to present a blunt edge at 7 about its central opening where it bears against the hub 8. An inner rim 9, having a raised peripheral central portion, provided with shoulders and depressed edge-portions extending outwardly from the shoulders, rigidly confines the disks at their flanges 6 between the depressed edge-portions of the inner rim and any suitable form of outer rim 10, that shown being a conventional representation of a clencher-rim for retaining a pneumatic tire (not shown). The corrugations in the flanges 6 insure close bearing against them of the rims between which they are confined. With the center-forming disks thus rigidly held, a reinforcing ring 11 may, but not necessarily, be interposed between them within the inner rim 9, as represented. The hub 8 shown comprises an externally-threaded thimble-portion having a rigid circumferential flange 12 formed on it near its inner end, a similarly shaped annular head 13 applicable about the hub-thimble at its outer end, a nut 14 screwing on the threaded section of the thimble against the head, and caps 15 enveloping the nut and the closed outer hub-end.

With the disks 5 clamped between the rim-members, as described, the hub is inserted at its outer end through their central openings, whereupon the head 13 is applied to its place and the nut 14 is screwed against it, with the result of straining the disks to dish and converge them toward the hub. The strain under which the disks 5 are thus confined so stiffens them as to greatly reinforce the wheel-structure and render it strong, notwithstanding the light weight of its center-forming disks.

The construction illustrated in Fig. 2 is substantially like that shown in Fig. 1 with an added outer annular reinforcing disk $5^a$ of the same material as that of the disks 5. This outer disk is clamped at its preferably corrugated peripheral flange $6^a$, like the disks 5, between the rims 9 and 10 with its center surrounding the hub near the outer end of the latter; and a nut $14^a$ on the screw-thread is turned to be moved outwardly against the disk to dish and strain it for the aforesaid stiffening effect to add reinforcement to the wheel-center. A cap $15^a$, in this instance, extends about the closed outer end of the hub from the nut $14^a$.

The modified construction illustrated in Fig. 3 is more particularly designed for aeroplanes and motorcycles, on which it is not desirable to have the hub project materially at either end beyond the center-forming disks. In this case the hub $8^a$ is threaded externally to be engaged by nuts $14^b$. The annular disks $5^b$, $5^b$, are clamped at peripheral flanges 6 between the rims 9 and 10, the same as described in connection with Figs. 1 and 2, and they surround the hub at their central openings where they bear against the outer faces of the nuts, which are turned to advance toward the hub-ends and thus strain the disks to there diverge them for affording thereto the aforesaid stiffening and resultant reinforcing function, whereby the wheel is also rendered strong and adapted to carry heavy loads without buckling or collapsing, notwithstanding the relatively light-weight disks.

I realize that considerable variation is possible in the details of construction thus specifically shown and described, and I do not intend by illustrating a single specific embodiment of my invention to be limited thereto, my intention being in the following claims to claim protection upon all the novelty there may be in my invention as fully as the state of the art will permit.

I claim:

1. A vehicle-wheel comprising, in combination with a rim and a hub, a pair of center-forming resilient disks rigidly secured to the rim, and strained to extend in converging relation toward the hub, and a third resilient disk rigidly secured to the rim and strained into dished condition toward the outer hub-end, said disks being rigidly secured in their said relations on the hub.

2. A vehicle-wheel comprising, in combination, an outer rim, an inner rim and a hub, a pair of center-forming resilient disks having peripheral flanges at which they are secured between said rims, said disks being strained to extend in converging relation between the rims and hub, and means on the hub for securing the strained disks in said relation.

3. A vehicle-wheel comprising, in combination, an outer rim, an inner rim and a hub, a pair of center-forming resilient disks having peripheral flanges at which they are secured between said rims, said disks being strained to extend in converging relation toward the hub, and a third peripherally flanged resilient disk secured at its flange between said rims and strained into dished condition toward the outer hub-end, said disks being rigidly secured in their said relations on the hub.

4. A vehicle-wheel comprising, in combination, an outer rim, an inner rim having a raised central portion provided with shoulders and depressed edge-portions, and a hub, a pair of center-forming resilient disks having peripheral flanges at which they are secured between the outer rim and depressed portions of the inner rim, said disks being strained to extend in converging relation between the rims and hub, and means on the hub for securing the strained disks in said relation.

5. A vehicle-wheel comprising, in combination, an outer rim adapted to carry a tire, an inner rim, a ring within the inner rim, and a hub, a pair of center-forming peripherally flanged disks secured at their flanges between said rims and strained to extend from said ring in adjustable converging relation toward the hub, and means on the hub for securing the strained disks in said relation.

6. A vehicle-wheel comprising, in combination, a rim and a threaded hub provided with a flange, a pair of center-forming resilient annular disks rigidly secured to the rim and surrounding the hub, a nut-fastened head on the hub coöperating with said flange to strain and converge said disks toward the hub and secure them in their strained condition, a third resilient annular disk secured to the rim and surrounding the hub, and a nut on the hub operating to strain said third disk toward the outer hub-end and retain it in its strained condition.

ELMER L. ACKER.